April 7, 1931.　　　　C. W. DAKE　　　　1,799,286
LANDING LIGHT FOR AIRPLANES AND THE LIKE
Filed April 18, 1929　　　3 Sheets-Sheet 1
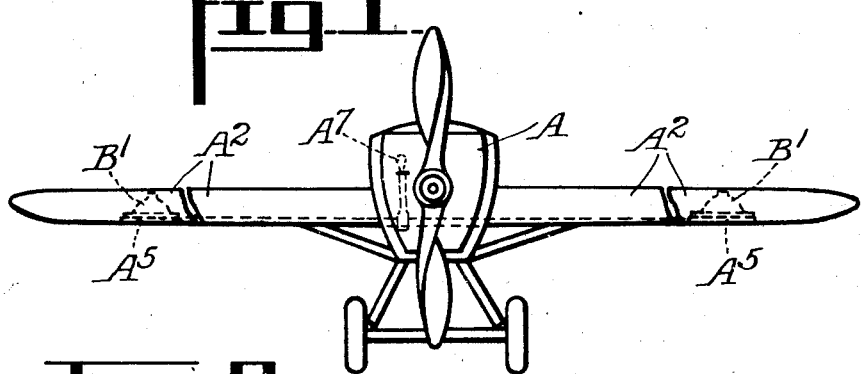
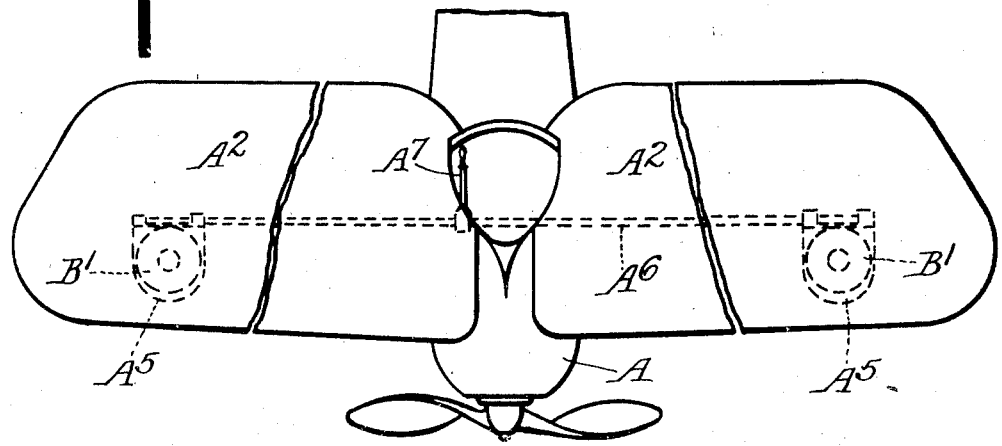
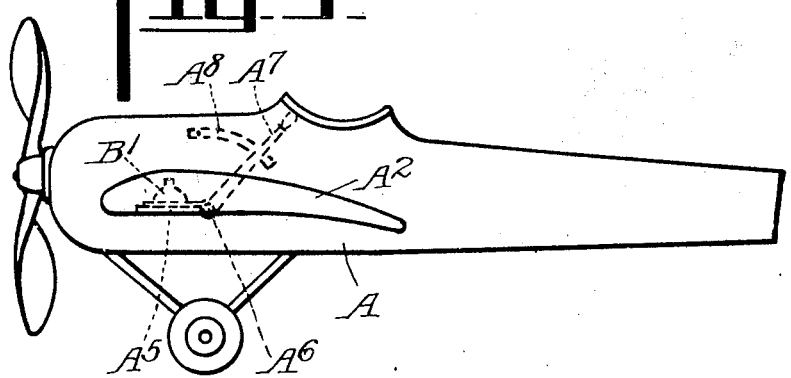
INVENTOR
Charles W. Dake
BY
Parker & Carter April 7, 1931.  C. W. DAKE  1,799,286
LANDING LIGHT FOR AIRPLANES AND THE LIKE
Filed April 18, 1929   3 Sheets-Sheet 2
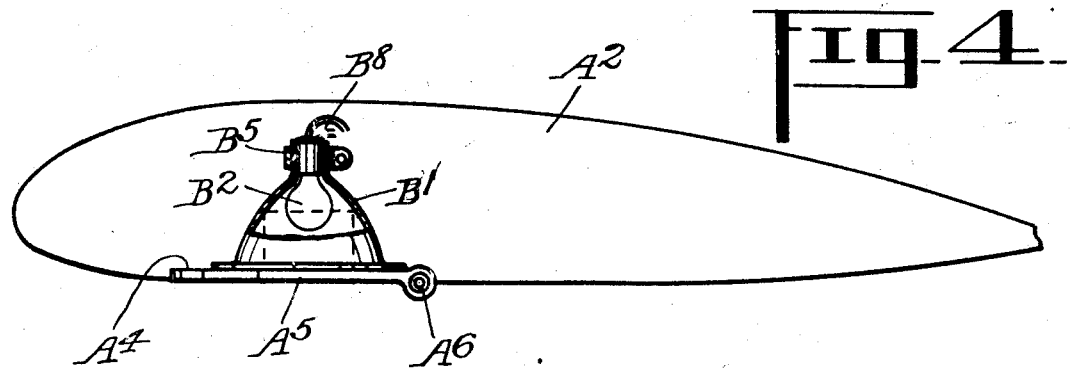
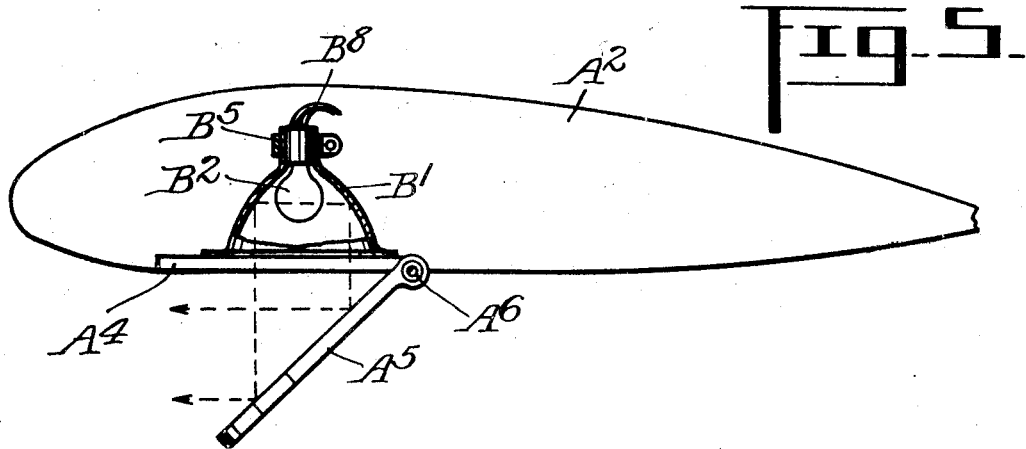
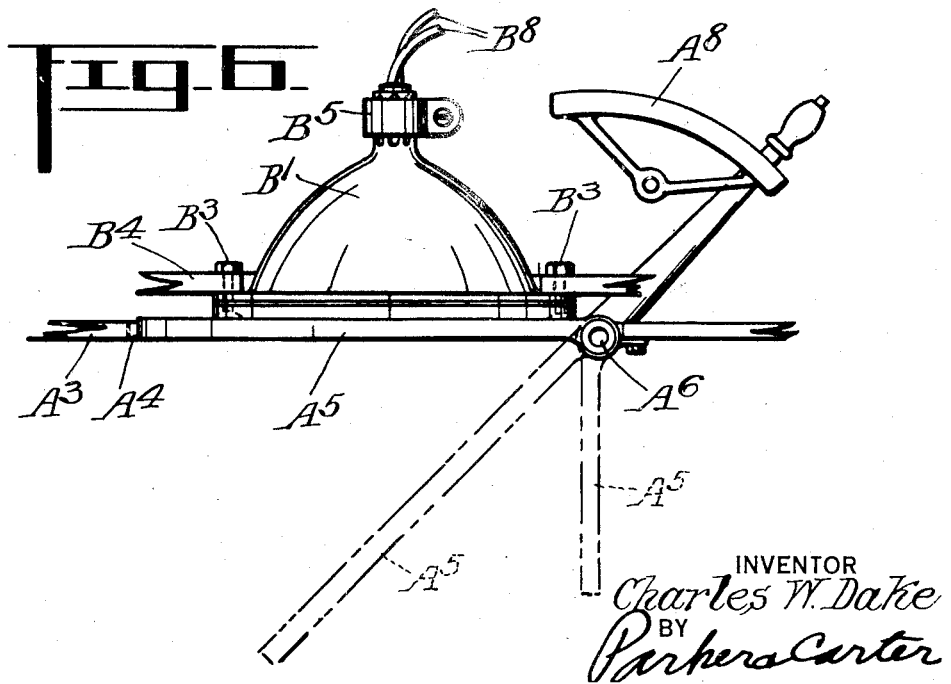
INVENTOR
Charles W. Dake
BY
Parker & Carter

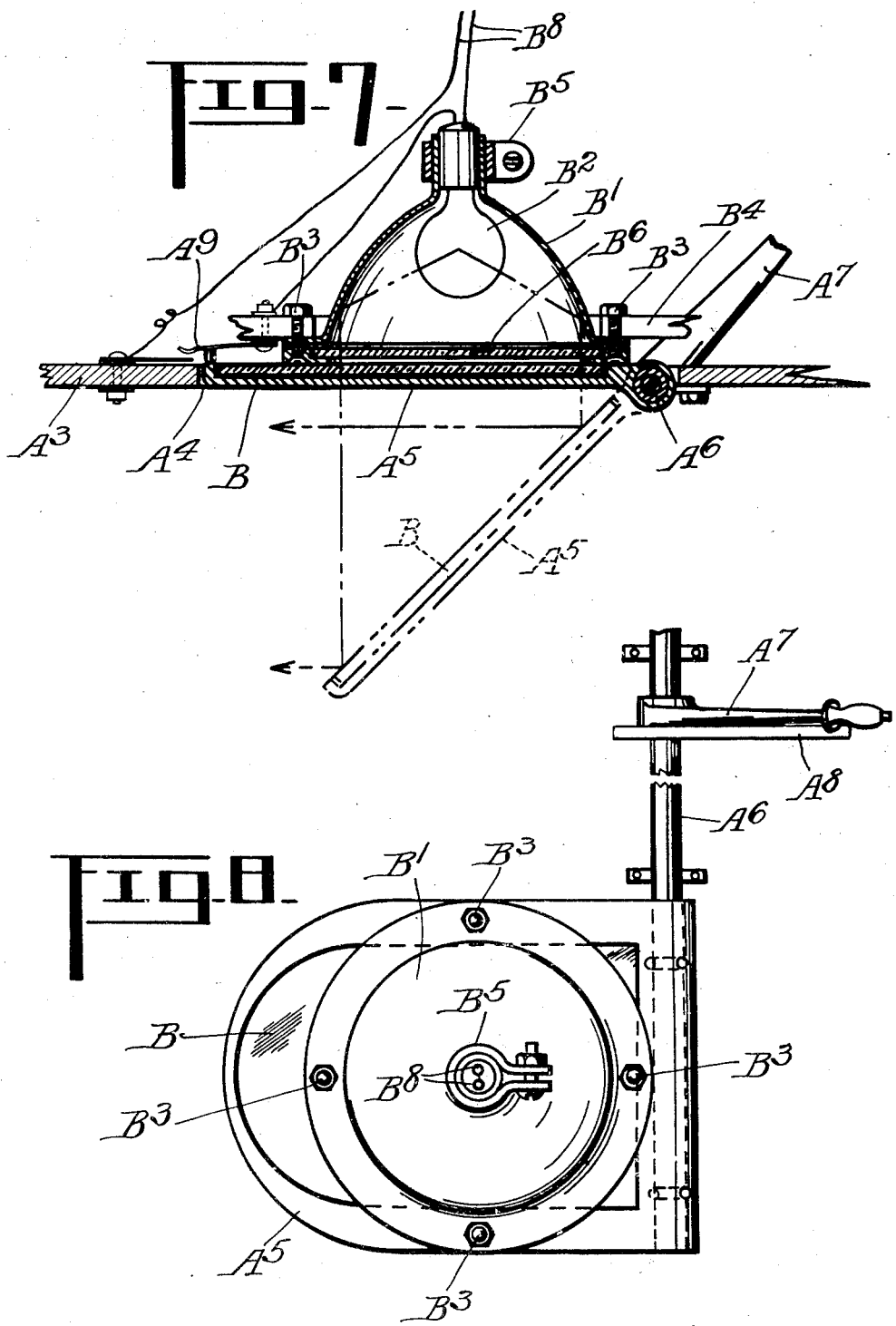

Patented Apr. 7, 1931

1,799,286

UNITED STATES PATENT OFFICE

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY

LANDING LIGHT FOR AIRPLANES AND THE LIKE

Application filed April 18, 1929. Serial No. 356,013.

My invention relates to improvements in landing lights for aircraft and the like and has for one object to provide a new and improved landing light which is entirely contained within the contour line of the wing section, fuselage or other part of the ship, but which can direct its rays at the will of the operator downwardly or forwardly to illuminate the ground upon which a landing is to take place.

By my arrangement the lamp itself being the heavy delicate part of the combination is permanently fixed in place and there are associated with it elements, for instance, a reflector controlled by the operator which may be projected beyond the wing section to receive and reflect the light from the lamp and direct the light forwardly at the will of the operator. The reflector, when not in use, serves as a closure for the pocket in which the light is mounted and thereby continues the contour of that part of the aircraft in which the light is mounted so that no interference with the contour of the wing or other body section results from the presence of the light and so that there will be no parasite drag as a result of the existence of the light.

My invention is illustrated more or less diagrammatically in the accompanying drawings, wherein—

Figure 1 is a front elevation of an airplane;

Figure 2 is a plan view;

Figure 3 is a side elevation shown for the purpose of illustrating the position of the lamp itself in a specimen form of aircraft;

Figure 4 is a part section, part elevation of the lamp in the inoperative position;

Figure 5 is in operative position, showing the relation of the aircraft wing;

Figure 6 is a detailed plan view of the lamp mounting and control means;

Figure 7 is a section through the lamp; and

Figure 8 is a plan view of the lamp itself.

Like parts are indicated by like characters throughout the specification and drawings.

A is an airplane fuselage having wings $A^2$, the wing having an under surface $A^3$ apertured at $A^4$. This aperture is closed by a pivoted shutter $A^5$. The shutter is mounted for rotation with a longitudinally extended control shaft $A^6$ which in this case extends clear across the airplane so that the one shaft carries a shutter in each wing. $A^7$ is a control hand lever associated with a quadrant $A^8$ whereby the operator may open or close the shutter to throw the light into or out of operation. Associated with the shutter is a switch $A^9$ adapted when the shutter is open to close an electric light circuit and when the shutter is completely closed to open the light circuit, so that the light will be turned on when the shutter is open and off when it is closed. It will be noted from Figures 4 and 5 that when the shutter is closed it conforms to the contour of the under side of the airplane wing so as to provide a smooth, generally unobstructed surface and not interfere with the aero-dynamic characteristics of the wing.

On the underside of this shutter is a reflecting surface or mirror B. Mounted inside the wing structure and in register with the aperture $A^4$ is a reflecting bowl $B^1$ having a light source $B^2$ held in place by bolts $B^3$ engaging the wing structure $B^4$ and by a bracket $B^5$ engaging part of the wing structure. This bowl is closed by a lens or transparent window $B^6$ and the electric current to light the lamp is supplied through the conductors $B^8$, being controlled by the switch $B^9$.

It will be noted that the shutter and reflecting surface or mirror is elongated so that when the reflector is in the dotted line position shown in Figure 7 all of the parallel rays projected out by the lamp through the window $B^6$ will impinge from the reflector and be reflected forwardly to light the ground upon which the plane is about to land. This necessitates an aperture in the wing surface longer than the diameter of the light bowl but this is of no consequence because it is closed under normal operating conditions by the shutter. The shape of the shutter and its reflector then depends upon the size of the light and the angle at which the shutter is to be placed. The sharper the angle of the shutter to the axis of the bowl the longer it must be to receive all the light rays.

It will be noted that the relation between the controlling lever and the quadrant is such that the shutter may if desired be extended downwardly parallel with the axis of the light bowl into the position shown in dotted lines at the right hand side of Figure 6. Under such conditions no forward light will be available but the light will be availabe to illuminate the ground immediately beneath the wing as for instance for work around the plane after a landing has taken place or for purposes of illuminating the ground immediately below the plane before a landing.

The shutter which closes the opening in which the light source with or without a reflecting bowl is contained serves as a shutter in the sense that it closes the opening against the ingress of air during the time when normal flight takes place. The shutter also serves to shut off the light and is an optical shutter as well as a physical shutter.

I have illustrated my invention as applied to an airplane. Obviously the device might be applied equally to any type of aircraft lighter than or heavier than the wing, the point being that in every case the heavy delicate light source with or without its reflector is contained inside the contour of the ship and only the light rigid simple deflecting means are arranged adjustably mounted so that they may be positioned at the will of the operator independent of the light position to deflect or direct the light rays.

I claim:

1. In combination with an aircraft, a landing lamp comprising a reflector and light source permanently mounted in fixed position entirely enclosed within the contour of the ship, the axis of the reflector being substantially vertical, means controlled by the operator for selectively shutting off the light, directing the light forwardly and directing it downwardly.

2. In combination with an aircraft, a landing lamp comprising a reflector and light source permanently mounted in fixed position entirely enclosed within the contour of the ship, the axis of the reflector being substantially vertical, means controlled by the operator for selectively shutting off the light, directing the light forwardly and directing it downwardly, said means including a separate reflector adjustable in position by the operator.

3. In combination with an aircraft, a landing lamp comprising a reflector and light source entirely enclosed within the contour of the ship, the axis of the reflector being substantially vertical, means controlled by the operator for selectively shutting off the light, directing the light forwardly and directing it downwardly, said means comprising a reflector adjustable in position by the operator and a light control switch adapted to operate in coordination and responsive to the movement of the reflector.

4. In combination with an aircraft, a landing lamp comprising a reflector bowl and light source entirely enclosed within the contour of the ship of the airplane, an aperture in the under surface of the ship in register with the lamp, a shutter adapted to close said structure, a reflector on the upper surface of the shutter adapted to receive and reflect light from the landing lamp, means for angularly displacing the shutter to project it beyond the ship surface and cause light from the lamp to be forwardly reflected, the shutter being movable into a position parallel with the axis of the reflector bowl to permit projection of light downwardly by the reflector bowl.

5. In combination with an aircraft, a landing lamp comprising a reflector bowl and light source entirely enclosed within the contour of the ship, an aperture in the under surface of the wing in register with the lamp, a shutter adapted to close said aperture, and a switch adapted to automatically shut off the light when the shutter closes the aperture and to automatically turn on the light when the shutter projects from the wing surface.

6. In combination with an aircraft, a light source entirely enclosed within the contour of the ship, a reflector bowl associated therewith, the axis of the bowl being substantially normal to the surface of the member within which they are enclosed and a removable reflector adapted to lie in the path of the beam projected by the light source by the bowl and to reflect light rays in a direction generally parallel with the exterior surface of the member in which the light source and bowl are enclosed, the reflector being adapted to be selectively positioned along and in parallelism with the surface of the member and project therefrom, and a switch adapted to control the light source to extinguish the light when the light is parallel with the member and to illuminate the light when the reflector projects therefrom.

7. In combination with an aircraft, a reflector bowl, a light source therein, the bowl and light source contained entirely within the contour of the ship, the axis of the reflector bowl being normal to the wall of the ship, a shutter adapted to lie in prolongation of the wall of the ship, pivoted at one side of the bowl and means controlled by the operator for selectively rotating and positioning said shutter in prolongation of the wall of the ship through an angle of ninety degrees to a position normal to the wall of the ship, a reflecting surface on the underside of the shutter, the relation between the reflecting bowl, the light source and the reflecting shutter being such that the operator may control the direction of the beam of light from the light source through an angle from parallelism with the wall of the ship to perpendicularity thereto.

8. In combination with an aircraft, a reflector bowl, a light source therein, the bowl and light source contained entirely within the contour of the ship, the axis of the reflector bowl being normal to the wall of the ship, a shutter adapted to lie in prolongation of the wall of the ship, pivoted at one side of the bowl and means controlled by the operator for selectively rotating and positioning said shutter in prolongation of the wall of the ship through an angle of ninety degrees to a position normal to the wall of the ship, a reflecting surface on the underside of the shutter, the relation between the reflecting bowl, the light source and the reflecting shutter being such that the operator may control the direction of the beam of light from the light source through an angle from parallelism with the wall of the ship to perpendicularity thereto, a switch adapted to control the supply of current to the light source, and means responsive to the positioning of the shutter for breaking the circuit when the shutter is closed and for opening the circuit when the shutter is open.

9. In combination with an aircraft, a reflector bowl, a light source therein, the bowl and light source contained entirely within the contour of the ship, the axis of the reflector bowl being normal to the wall of the ship, a shutter adapted to lie in prolongation of the wall of the ship, pivoted at one side of the bowl and means controlled by the operator for selectively rotating and positioning said shutter in prolongation of the wall of the ship through an angle of ninety degrees to a position normal to the wall of the ship, a reflecting surface on the underside of the shutter, the relation between the reflecting bowl, the light source and the reflecting shutter being such that the operator may control the direction of the beam of light from the light source through an angle from parallelism with the wall of the ship to perpendicularity thereto, a switch adapted to control the supply of current to the light source, and means responsive to the positioning of the shutter for breaking the circuit when the shutter is closed and for opening the circuit when the shutter is open, the switch operation being independent of shutter position when the shutter is out of parallelism with the wall of the ship.

Signed at Chicago, county of Cook and State of Illinois, this 11th day of April, 1929.

CHARLES W. DAKE.